United States Patent
Cui et al.

(10) Patent No.: US 9,017,434 B2
(45) Date of Patent: Apr. 28, 2015

(54) SYSTEM AND PROCESS FOR MAKING HYDROGEN FROM A HYDROCARBON STREAM

(75) Inventors: Jingyu Cui, Katy, TX (US); Mahendra Ladharam Joshi, Katy, TX (US); Scott Lee Wellington, Bellaire, TX (US)

(73) Assignee: Shell Oil Company, Houston, TX (US)

(*) Notice: Subject to any disclaimer, the term of this patent is extended or adjusted under 35 U.S.C. 154(b) by 0 days.

(21) Appl. No.: 13/092,280

(22) Filed: Apr. 22, 2011

(65) Prior Publication Data
US 2011/0200493 A1   Aug. 18, 2011

Related U.S. Application Data

(62) Division of application No. 12/353,588, filed on Jan. 14, 2009, now Pat. No. 7,959,897.

(60) Provisional application No. 61/021,593, filed on Jan. 16, 2008.

(51) Int. Cl.
| | |
|---|---|
| C01B 3/48 | (2006.01) |
| C01B 3/02 | (2006.01) |
| C01B 3/32 | (2006.01) |
| C01B 3/50 | (2006.01) |
| C01B 3/38 | (2006.01) |

(52) U.S. Cl.
CPC . *C01B 3/384* (2013.01); *C01B 3/48* (2013.01); *C01B 3/505* (2013.01); *C01B 2203/0233* (2013.01); *C01B 2203/0288* (2013.01); *C01B 2203/041* (2013.01); *C01B 2203/043* (2013.01); *C01B 2203/0445* (2013.01); *C01B 2203/0475* (2013.01); *C01B 2203/0816* (2013.01); *C01B 2203/1058* (2013.01); *C01B 2203/1211* (2013.01); *C01B 2203/1223* (2013.01); *C01B 2203/1241* (2013.01); *C01B 2203/1288* (2013.01); *C01B 2203/86* (2013.01)

(58) Field of Classification Search
CPC .......... C01B 3/384; C01B 3/48; C01B 3/505; C01B 2203/0233; C01B 2203/041; C01B 2203/0445; C01B 2203/86
USPC ........................................................... 48/61
See application file for complete search history.

(56) References Cited

U.S. PATENT DOCUMENTS

| | | | |
|---|---|---|---|
| 5,861,137 A | 1/1999 | Edlund | 423/652 |
| 6,152,987 A | 11/2000 | Ma et al. | 95/56 |
| 6,821,501 B2 | 11/2004 | Matzakos et al. | 423/652 |
| 7,175,694 B2 | 2/2007 | Ma et al. | 95/56 |
| 7,297,169 B2 | 11/2007 | Pham et al. | |
| 7,513,919 B2* | 4/2009 | Barnett et al. | 48/61 |
| 7,790,059 B2* | 9/2010 | Peng et al. | 252/373 |
| 2003/0110693 A1* | 6/2003 | Drnevich et al. | 48/197 R |

(Continued)

FOREIGN PATENT DOCUMENTS

| | | | |
|---|---|---|---|
| EP | 1839736 | 10/2007 | B01J 8/02 |
| JP | 05147902 | 6/1993 | C01B 3/38 |

*Primary Examiner* — Matthew Merkling
(74) *Attorney, Agent, or Firm* — Charles W. Stewart (57) ABSTRACT

This invention relates to a process and apparatus for the production of pure hydrogen by steam reforming. The process integrates the steam reforming and shift reaction to produce pure hydrogen with minimal production of CO and virtually no CO in the hydrogen stream, provides for $CO_2$ capture for sequestration, employs a steam reforming membrane reactor, and is powered by heat from the convection section of a heater.

7 Claims, 9 Drawing Sheets

(56) References Cited

U.S. PATENT DOCUMENTS

| | | | |
|---|---|---|---|
| 2005/0097819 A1* | 5/2005 | Lomax et al. | 48/127.9 |
| 2006/0248800 A1 | 11/2006 | Miglin et al. | 48/198.7 |
| 2007/0028860 A1* | 2/2007 | Hemsath | 123/3 |
| 2007/0051041 A1* | 3/2007 | Genkin et al. | 48/197 R |

* cited by examiner

SYSTEM AND PROCESS FOR MAKING HYDROGEN FROM A HYDROCARBON STREAM

This application is a divisional of application Ser. No. 12/353,588, filed Jan. 14, 2009 now U.S. Pat. No. 7,959,897, which claims the benefit of U.S. Provisional Application No. 61/021,593 filed Jan. 16, 2008, the entire disclosure of which is hereby incorporated by reference.

FIELD OF THE INVENTION

The invention relates to a system and process for making hydrogen from a hydrocarbon stream.

BACKGROUND OF THE INVENTION

Hydrogen production is commercially proven, but expensive. One method of producing hydrogen is steam methane reforming where hydrocarbons and water are reacted to form CO and $H_2$, followed by a separate water-gas-shift reaction where CO is reacted with $H_2O$ to form $CO_2$ and $H_2$. The commercial application of these reactions in many refineries commonly involves a series of reactors including a steam reforming reactor, and several post reactors to address the production of CO in the reformer. The post reactors include a high temperature shift reactor, a low temperature shift reactor, and a $CO_2$ absorber separator. Water and $CO_2$ separation is necessary to achieve pure hydrogen. The reforming reactor is run at high pressure to avoid hydrogen recompression downstream. The pressure lowers the equilibrium conversion since reforming produces a positive net mole change. The steam reforming reaction is very endothermic, about 206 kJ/mole; and the shift reaction is exothermic, providing about 41 kJ/mole. The conventional steam reforming reactors are operated above 900° C. to push the equilibrium toward complete formation of CO and $H_2$. The high temperature causes severe corrosion and stress problems on the equipment. Steam reforming reactors are generally large to accomplish economies of scale. Furthermore, designs currently known do not lend themselves to being scaled down to a smaller size or to making it possible to efficiently control the temperature at various points.

In production of hydrogen by conventional steam reforming processes like the one described above, only 50 percent to 60 percent of the heat generated in the process is used for hydrogen production. The remaining 40 percent to 50 percent is recovered for combustion air preheating, feed preheating, process steam generation, and export steam generation. The generation of export steam in a conventional steam reforming process is unavoidable due to the excess or waste heat leaving the steam reformer furnace in the form of hot flue gas.

In many refinery applications, there is no demand for the export steam that can be produced from the steam reformer. If the refinery cannot utilize the export steam, it is difficult for the conventional steam reforming process to efficiently utilize the energy consumed by the reformer and, thus, will face challenges to supply hydrogen on a cost-effective basis. Typical large steam reformers (80 to 100 mM SCF/D $H_2$) typically run at a net efficiency of about 370 BTU/SCF $H_2$ (with export steam) and a gross efficiency of about 410 BTU/SCF $H_2$ (without export steam). The additional heat (30-40 BTU/SCF) that is captured and converted to export steam has a significant impact on the cost of hydrogen production. For example, waste heat captured and converted to export steam for a 100 mM SCF/D hydrogen plant the is worth approximately eight million dollars per year in energy costs. Thus, it would be desirable to capture this waste heat to improve the energy utilization and cost of hydrogen production of the conventional steam methane reformer.

Hydrogen can be produced in membrane steam reformer units. For example, U.S. Pat. No. 6,821,501 discloses an apparatus and method for steam reforming membrane reactor which includes membrane steam reformer tube comprising a membrane tube surrounded by a reaction tube forming an annulus that is packed with a reaction catalyst. The process allows for the combination of the reforming reaction $CH_4 + H_2O \leftrightarrow CO_2 + H2$ and the shift reaction $CO + H_2O \leftrightarrow CO_2 + H_2$ to be combined in one reactor. Additionally, the process takes place at a temperature of from about 450° C. to about 550° C., significantly lower then conventional steam reforming units.

U.S. Pat. No. 5,861,137 discloses a compact, mobile steam reformer that includes a tubular hydrogen permeable and hydrogen selective membrane. A reforming bed surrounds at least part of the membrane. An inlet to the reforming bed receives a mixture of alcohol or hydrocarbon vapor and steam and an outlet from the reforming bed releases reforming byproduct gases. A heating element heats the reforming bed to an operating temperature and a second bed including a methanation catalyst is placed at the permeate side of the membrane. A reformer outlet withdraws hydrogen gas from the second bed. In one aspect, the heating element is a third bed including an oxidation catalyst surrounding at least a portion of the first bed. The reforming byproduct gases released from the reforming bed mix with an air source and catalytically ignite to generate heat and thermally support the process of reforming within the reforming bed.

Therefore it would be desirable in the art to provide a steam reformer reactor design that could utilize the waste heat of conventional heaters or steam methane reformer furnace. If the waste heat in the convection section of a heater or steam methane reformer furnace could be used to produce hydrogen, it would represent a distinct advance in the art. In addition, the if the process could be constructed for significantly lower capital costs and have lower operating costs, it would be desirable. Furthermore, if the process produced $CO_2$ in higher concentrations and greater purity than other processes in the art, and the $CO_2$ could be sequestered for other uses, it would be extremely desirable. Such an integrated system would demonstrate far greater efficiency than any hydrogen generating system currently available.

BRIEF SUMMARY OF THE INVENTION

The present invention is directed to a system and method relates to a process system and method of producing hydrogen.

In one embodiment, a process system comprising a heater having a downstream section for transporting flue gases produced during combustion of a fuel source and a membrane reformer unit, wherein the membrane reformer unit is positioned within a downstream section of the heater, whereby heat is transferred to the membrane reformer primarily by convection from the flue gases. The heater can include any process heater such as a steam methane reformer furnace, a gasifier used for making hydrogen, a direct fired heater, and a steam boiler.

In one embodiment, the membrane reformer unit further comprises one or more membrane reformer tubes, wherein at least one of the membrane reformer tubes comprises a membrane tube having a membrane tube length and a membrane tube wall that defines a product extraction zone, wherein the membrane tube includes a distal end and a product outlet end for discharging product; and a reaction tube having a reaction tube length and that is positioned external to and surrounding the membrane tube so there is defined a reaction zone along the membrane tube length, wherein the reaction tube has a reaction tube inlet for receiving a reactant feed into the reaction zone and a reaction zone outlet for discharging one or more reaction products from the reaction zone, and wherein the reaction zone is packed with a reaction catalyst.

The membrane tube wall can include a porous metal substrate and a hydrogen-selective membrane, wherein the hydrogen-selective membrane overlies the porous metal substrate and the hydrogen-selective membrane can include palladium or any alloy thereof. The reaction catalyst can be any reforming catalyst, supported or unsupported. In one aspect of the invention the reaction catalyst is a nickel catalyst.

The membrane reformer tubes can be oriented in any relationship with the flue gas flow direction. In one aspect of the invention, the longitudinal axis of the membrane reformer tubes of the membrane reformer unit is parallel to the direction of flow of the flue gas through the convection section of the steam methane reformer heater. In another the longitudinal axis of the membrane reformer tubes of the membrane reformer unit is orthogonal to the direction of flow of the flue gas through the steam methane reformer heater.

In one embodiment, a process of producing hydrogen in a steam methane reformation system comprising: (1) combusting a fuel source to generate a flue gas; (2) passing the flue gas through a membrane reformer unit positioned within the convection section of the heater to raise the temperature of the membrane reformer tubes to a desired temperature, the membrane reformer unit comprising: (a) a reaction tube having a reaction tube length, and (b) a membrane tube having a membrane tube length and a membrane tube wall, wherein said membrane tube wall comprises a porous metal substrate and a hydrogen-selective membrane, wherein the hydrogen-selective membrane overlies said porous metal substrate; (3) introducing a mixture comprising a hydrocarbon and steam into an inlet of the reaction tube, the reaction tube being positioned external to and surrounding the membrane tube, thereby defining a reaction zone along the membrane tube length, the reaction zone being packed with a reaction catalyst; (4) removing carbon dioxide from the outlet of the reaction tube; and (5) removing hydrogen from the outlet of the membrane tube.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Production of hydrogen using conventional steam reforming is a complex, multi-step process that can be represented by the following reactions:

$$CH_4 + H_2O \leftrightarrow CO + 3H_2 + 206.4 \text{ KJ/GMOL} \quad \text{(R1) REFORMING:}$$

$$CO + H_2O \leftrightarrow CO_2 + H_2 - 41.1 \text{ KJ/GMOL} \quad \text{(R2) WATER-GAS SHIFT}$$

$$CH_4 + 2H_2O \leftrightarrow CO_2 + 4H_2 + 165.3 \text{ KJ/GMOL} \quad \text{(R3) COMBINATION}$$

Chemical equilibrium and heat transfer limitations are the two factors that govern the production of hydrogen from methane in conventional reactions. These factors lead to the construction of large reactors fabricated from expensive high temperature tolerant materials. They are enclosed in high temperature furnaces that are needed to supply the high heat fluxes.

Figure 1:
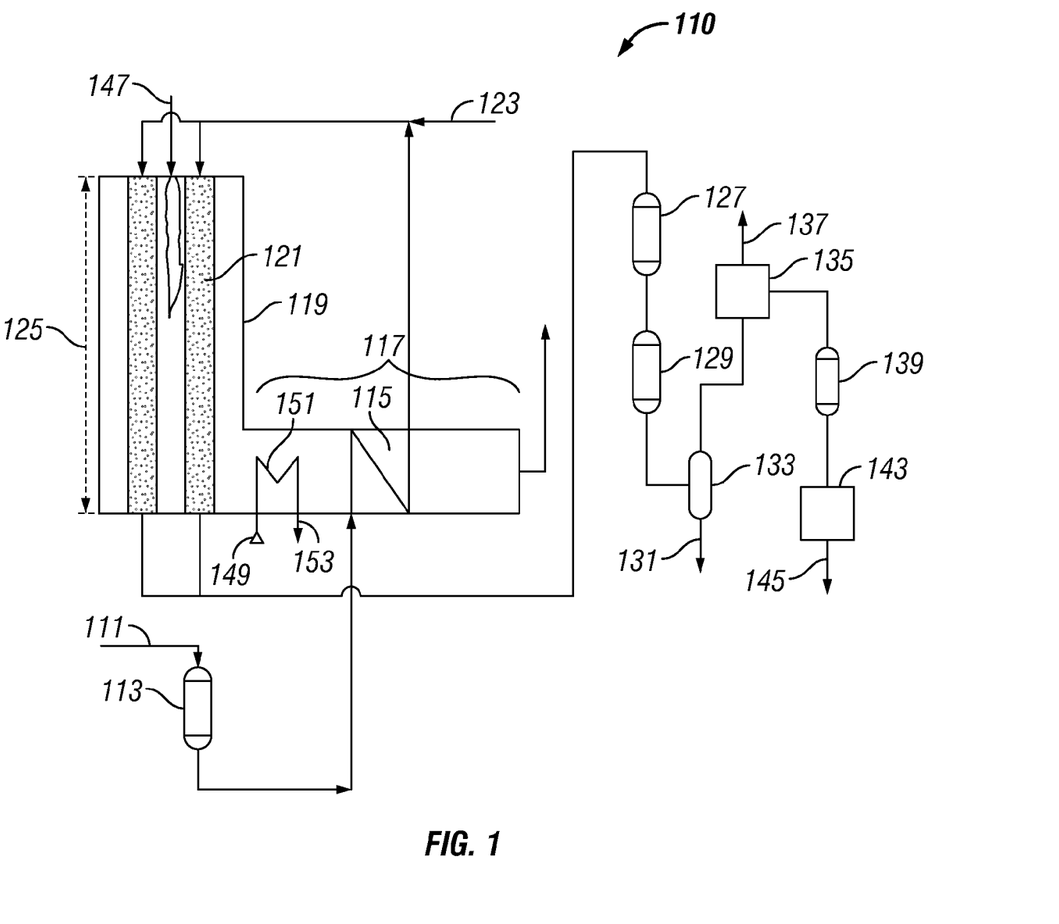
FIG. 1 is a process flow diagram showing a conventional steam reforming process.

FIG. 1 shows a process flow diagram of a typical hydrogen production process 110 using conventional steam reforming. FIG. 1 shows the feed gas inlet conduit 111 containing a vaporizable hydrocarbon (e.g. naphtha, methane, methanol). The feed gas inlet conduit enters a feed gas purification reactor 113. The purification reactor 113 is necessary to remove contaminants from the hydrocarbon that can poison the catalyst used in the reformation stage of the process. The most common contaminant is sulfur, thus most purification reactors typically will be a desulphurization reactor. Additionally, other contaminants may include chlorides and metals. Thus, additional purification reactors to remove chlorides and metals may be necessary. After purification, the hydrocarbon is passed through a heater coil 115 typically located in the convection section 117 of the steam reformer furnace 119. (The convection section of a heater is any section of the heater where the primary means of heat transfer is via convection.) The heat transferred to the hydrocarbon from the convection section 117 of the steam reformer furnace 119 vaporizes the hydrocarbon feed. Prior to entering reformer reactor 121 located in the radiant section 125 of the steam reformer furnace 119, steam feed conduit 123 introduces $H_2O$, thus forming a mixture of the hydrocarbon feed gas and $H_2O$.

Reformer reactor 121 is packed with a catalyst, typically a nickel based catalyst, that converts the hydrocarbon and $H_2O$ mixture to a synthesis gas ("syngas") comprising CO and $H_2$ as shown above in reaction (R1).

Following reformation, the syngas is passed through high temperature shift reactor ("HTSR") 127 followed by low temperature shift reactor ("LTSR") 129. HTSR 27 and LTSR 129 shift most of the CO to $H_2$ as shown above in reaction (R2). After the shift reactions, $H_2O$ removal unit 131 removes $H_2O$, via conduit 133, from the hydrogen rich gas exiting LTSR 129. This is followed by removal of $CO_2$ in $CO_2$ removal unit 135 via $CO_2$ conduit 137. Any CO and $CO_2$ remaining is then converted to methane and water in methanator 139. Finally, the product gas, normally comprising 95%-97% $H_2$, is recovered via product conduit 145 from $H_2$ purifier 143.

While the preceding generally describes a typical conventional steam reforming unit, it should be evident to one of skill in the art that alternative embodiments of the conventional steam reforming unit exist. For example, $CO_2$ removal unit 135 and methanator 139 can be replaced with a pressure swing absorption unit ("PSA"). The PSA allows for production of H2 at higher purity levels. The PSA also allows for elimination of LTSR 129, since the PSA removes impurities such as CO from the syngas. In addition, the PSA produces a tail gas that can be used as a fuel source for the steam reformer furnace.

The reformation reaction is highly endothermic, requiring 206.4 kJ/gmol of heat. This heat is supplied to reformer reactor 121 by combusting a fuel source fed to steam reformer furnace 119 via fuel conduit 147. The combustion of fuel provides radiant energy that transfers the heat necessary to drive reaction (R1) in the radiant section 125 of steam reformer furnace 119. Additionally, combustion of fuel creates a hot flue gas that passes through steam reformer furnace 119. The hot flue gas can then be used to transfer heat via convection for other uses such as heating the hydrocarbon feed gas in heater coil 115. Additionally, heat contained in the hot flue gas can be used to produce steam. Typically, the steam reformer furnace includes steam coil 151 for the production of export steam. Boiler feed water is introduced through boiler feed water inlet 149 is passed through steam coil 151 and converted into steam that is exported from the hydrogen production unit 110 via steam conduit 153 for other uses.

The flue gas leaving radiant section 125 of the steam reformer furnace 119, after supplying the necessary high level heat to the reforming process, is in excess of 900° C. Thus, only about 50%-60% of the heat value of the fuel combusted is directly used by the hydrogen production unit. The heat content, or waste heat, of the flue gas created by combusting the fuel is used in the convection section 117 of steam reformer furnace 119 for various process and steam system duties, such as, production of process steam, export steam, combustion air preheating, and feed preheating. Because export steam credit can significantly alter the efficiency and overall production cost of hydrogen, increased production of hydrogen can have a favorable impact on both efficiency and overall production cost.

In the present invention, the two major problems of (1) need for additional hydrogen capacity and (2) improvement in energy efficiency associated with hydrogen production units are overcome by the innovative use of a membrane reformer unit in the convection section of a steam reformer furnace. The use of a membrane reformer unit in the convection section of the steam reformer furnace makes it possible to more efficiently use the energy in the system, as well as provide for increased hydrogen production or de-bottlenecking of the hydrogen production unit.

The membrane reformer unit employs a membrane fabricated preferably from an appropriate metal or metal alloy on a porous ceramic or porous metal support, as described below, to drive the equilibrium to high conversions. This allows for integration of the reforming and shift reactions into one reactor, reduces the energy needed to produce the hydrogen since reaction (R2) is exothermic, and partially offsets the endothermic reaction (R1). With reduced energy requirements, the membrane reformer unit can be run at much lower temperature than the conventional steam reformer units that must be operated at temperatures of 700-900+° C. A temperature of 500° C. is sufficient to drive the kinetics to high conversions when the equilibrium is shifted using the hydrogen separation membrane.

Because the membrane reformer unit can be operated at lower temperatures than conventional steam reformers, the membrane reformer unit can be integrated in the convection section of a conventional steam reformer furnace. The advantages of the use of the membrane reformer unit in combination with a conventional steam methane reformer are summarized as follows:

Utilization of furnace waste heat for the production of hydrogen, whereas, in contrast, in conventional hydrogen production units the waste heat is recovered for (1) making process steam, (2) making export steam, (3) preheating combustion air, and (4) preheating reactor feed;

Use of steam reformer furnace waste heat to produce hydrogen by placing the membrane reformer in the convection section of the steam reformer furnace can reduce or eliminate export steam production. Export steam has a significant effect on the overall hydrogen production cost. As export steam production increases, the economics for the hydrogen production become more favorable. Because many plants do not have a demand for the export steam, reduction or elimination of export steam production increases production costs. Use of the waste heat to produce $H_2$ offsets this export steam credit;

Increased hydrogen production from existing steam reformer units is obtained by replacing the steam coil with membrane reformer unit;

Recovery of waste heat from the steam reformer furnace will improve steam reformer furnace efficiency;

The use of a membrane reformer unit also provides $CO_2$ capture from the hydrogen production unit. The membrane reformer unit produces a $CO_2$ rich (about 95% or higher) stream that can be captured. This $CO_2$ rich stream can be sold, sequestered, or blended with other fuels and combusted in the steam reformer furnace for additional heat recovery;

The lower operating temperature of the membrane reformer unit allows for reduced steam reformer unit operating temperatures in contrast to conventional steam reforming units. This improves tube life of the steam reformer reactor;

Addition of a membrane reformer unit to a conventional steam reformer unit will reduce capital costs for a given $H_2$ production level; and Addition of a membrane reformer unit to a conventional steam reformer unit allows for improved turndown ratio of the unit.

Figure 2:
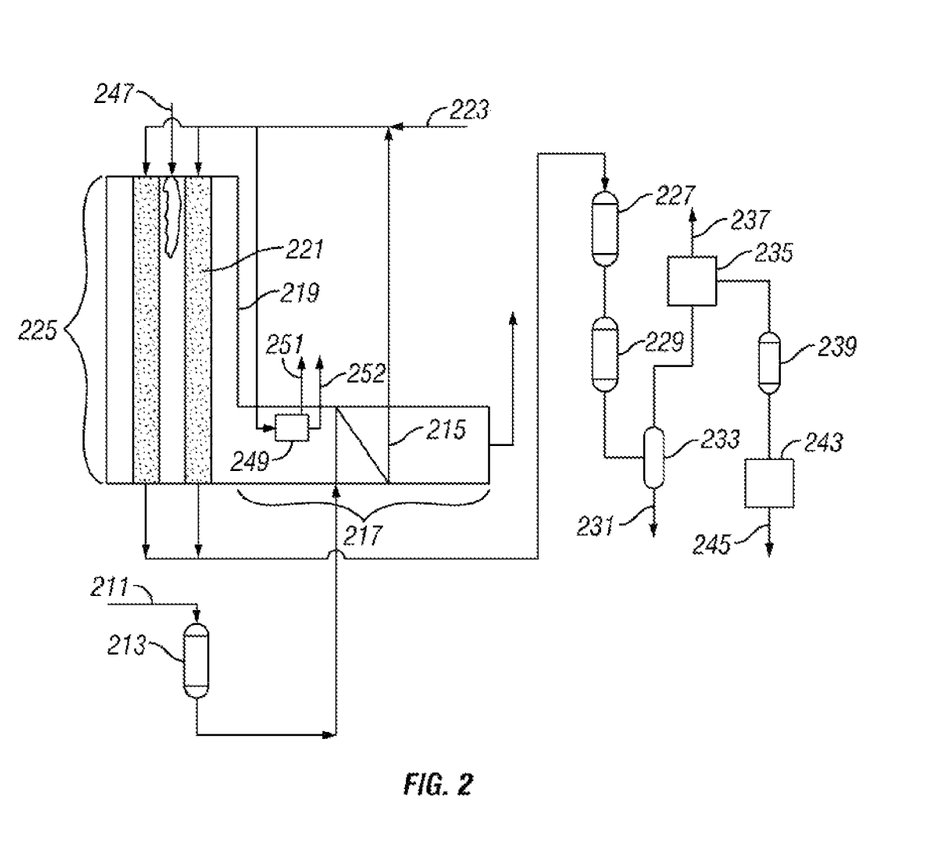
FIG. 2 is a process flow diagram showing one embodiment of the current invention integrating a membrane steam reformer unit with a conventional steam reforming process.

FIG. 2 shows a process flow diagram of one embodiment of the present invention. FIG. 2 shows a conventional steam reformer unit with a membrane reformer unit installed in the convection section of the steam reformer furnace. Similar to FIG. 1, FIG. 2 shows a feed gas inlet conduit 211 containing a vaporizable hydrocarbon (e.g. naphtha, methane, methanol). The feed gas enters a feed gas purification reactor 213. The purification reactor 213 is necessary to remove contaminants from the feed gas stream that can poison the catalyst used in the reformation stage of the process. The most common contaminant is sulfur, thus most purification reactors typically are desulphurization reactors. Additionally, other contaminants may include chlorides and metals. Thus, additional purification reactors for the removal of chlorides and metals may be necessary.

After purification, the feed gas is passed through a heater coil 215 typically located in the convection section 217 of the steam reformer furnace 219. The heat transferred to the feed gas stream from the flue gas passing through the convection section 217 of the steam reformer furnace 219 vaporizes the hydrocarbon feed gas stream. Prior to entering reformer reactor 221 located in the radiant section 225 of the steam reformer furnace 219, steam feed inlet conduit 223 introduces H$_2$O. This forms a mixture of the hydrocarbon-containing feed gas stream and H$_2$O.

Reformer reactor 221 is packed with a catalyst, typically a nickel based catalyst, that converts the hydrocarbon and water mixture to a synthesis gas ("syngas") comprising CO and H$_2$ as described in reaction (R1) above. Following reformation, the syngas is passed through high temperature shift reactor ("HTSR") 227 followed by low temperature shift reactor ("LTSR") 229. HTSR 227 and LTSR 229 shift most of the CO to H$_2$ as shown above in reaction R2. After the shift reactions, H$_2$O is removed from the hydrogen rich gas exiting LTSR 229 via H$_2$O removal conduit 231 of H$_2$O removal unit 233. This is followed by removal of CO$_2$ via CO$_2$ removal conduit 237 of CO$_2$ removal unit 235. Any CO and CO$_2$ remaining is then converted to methane and water in methanator 239. Finally, the final product gas, normally comprising 95%-97% H$_2$, is removed from the H$_2$ purifier 243 via H$_2$ conduit 245.

Similar to the conventional steam reformer furnace, fuel is supplied to reformer reactor 221 through fuel inlet conduit 247 to steam reformer furnace 219. The combustion of fuel provides radiant energy that transfers the heat necessary to drive reaction (R1) in the radiant section 225 of steam reformer furnace 219. Additionally, combustion of fuel creates a hot flue gas that passes through steam reformer furnace 219. The hot flue gas can then be used to transfer heat via convection in convection section 217 for other uses such as heating the hydrocarbon feed gas in heater coil 215. Additionally, heat contained in the hot flue gas is used to produce hydrogen.

In one embodiment, steam coil 151 of FIG. 1 is replaced with membrane reformer unit 249. A side stream from the feed to reformer reactor 221 comprising a mixture of H$_2$O and hydrocarbon is passed through membrane reformer unit 249 and converted into a H$_2$ rich stream that is captured via H$_2$ outlet conduit 251 and a CO$_2$ rich stream that is captured via CO$_2$ outlet conduit 252. Alternatively, a membrane reformer unit 249 could be inserted into the convection section of a process heater. Examples of process heaters include, but are not limited to: steam boilers, utility boilers, coker furnaces, crude preheater furnaces, ethylene cracker furnaces, platformer furnaces, thermal crackers, hydro cracker furnaces, hydrotreater furnaces, vacuum distiller furnaces, and the like.

Figure 3A:
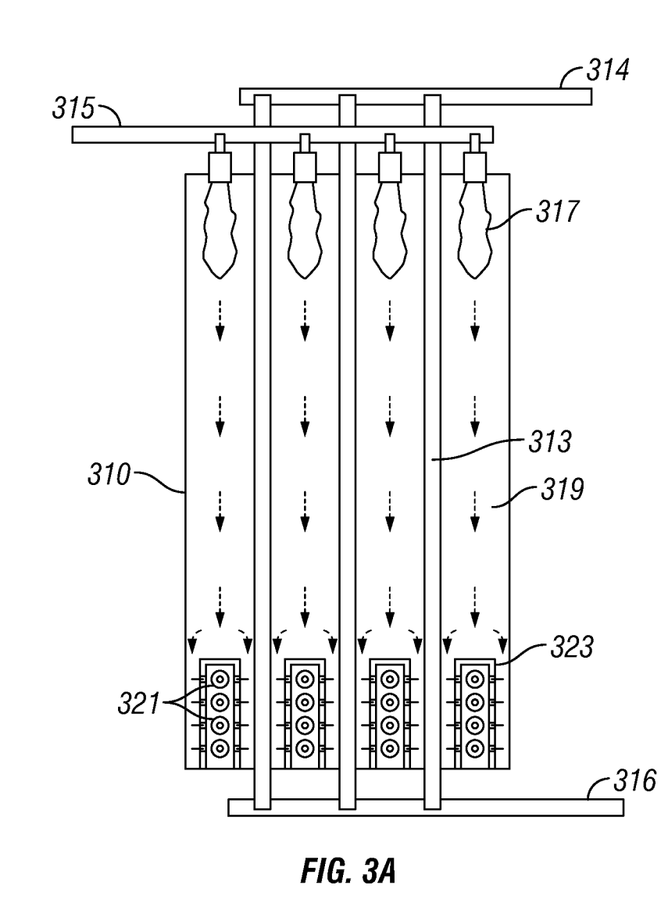
FIG. 3A is a schematic diagram of another embodiment of the current invention integrating a membrane steam reformer unit at the end of the reformer section in flue tubes.

The membrane steam reformer unit can also be located downstream of the radiant zone or reformation zone of a heater in a flue tunnel. FIG. 3A shows a schematic diagram of the location of the membrane reformer located downstream of the radiant section or reformation zone. FIG. 3A shows steam reformer furnace 310 and reforming tubes 313. Fuel inlet 315 introduces a fuel that is combusted in the combustion zone, creating burner flame 317 and flue gas 319. The reforming tubes 313 have a inlet conduit 314 that introduces a mixture comprising a mixture of H$_2$O and hydrocarbon to the reformer tubes 313.

The reformer tubes 313 are packed with a catalyst, typically a nickel based catalyst, that converts the hydrocarbon and water mixture to a syngas comprising CO and H$_2$ as described in reaction (R1) above. The syngas is removed from the reformer tubes 313 via outlet conduit 316 for further processing. The membrane steam reformer units 321 are located at the end of the reforming section inside flue tunnels 323. Flue tunnels are long structures constructed out of refractory material.

Figure 3B:
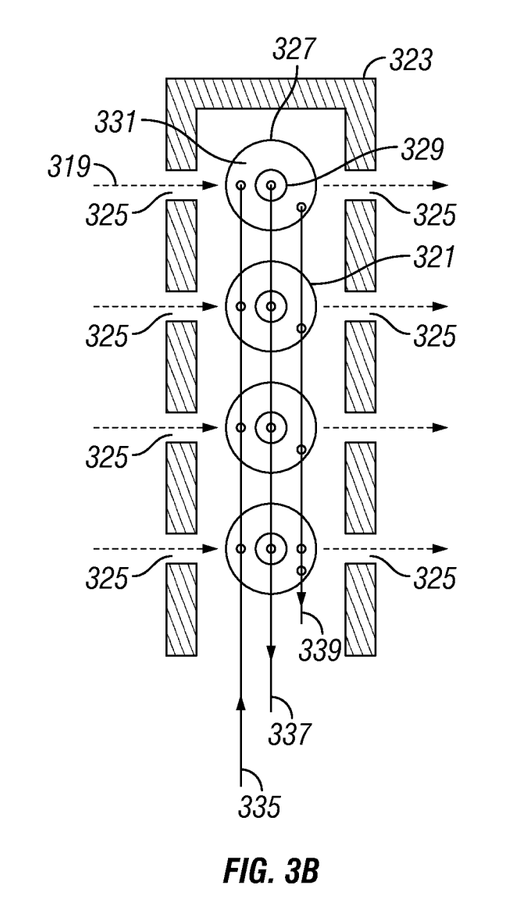
FIG. 3B is a schematic diagram depicting an exploded view of the flue tunnel from FIG. 3A.

Referring now to FIG. 3B, the flue tunnels 323 have openings 325 allowing flue gas 319 to pass through the flue tunnel 323. The flue tunnels 323 are shaped such that to create a plug flow of the flue gas 319 through the flue tunnel 323. The membrane steam reformers 321 located within the flue tunnels 323, have a reaction tube 327 that surrounds a membrane tube 329 and forms an annulus 331 or reaction zone that is packed with a catalyst, typically a nickel based catalyst, that converts the hydrocarbon and H$_2$O mixture to a CO$_2$ rich stream and H$_2$ as described in reaction (R3) above. The hydrocarbon and H$_2$O mixture is introduced into annulus 331 or reaction zone via an inlet conduit 335. The H$_2$ rich stream that is produced migrates through the membrane tube and is extracted from the membrane tube via H$_2$ extraction conduit 337. The CO$_2$ rich stream remains in the reaction zone and is extracted via CO$_2$ extraction conduit 339.

Figure 4:
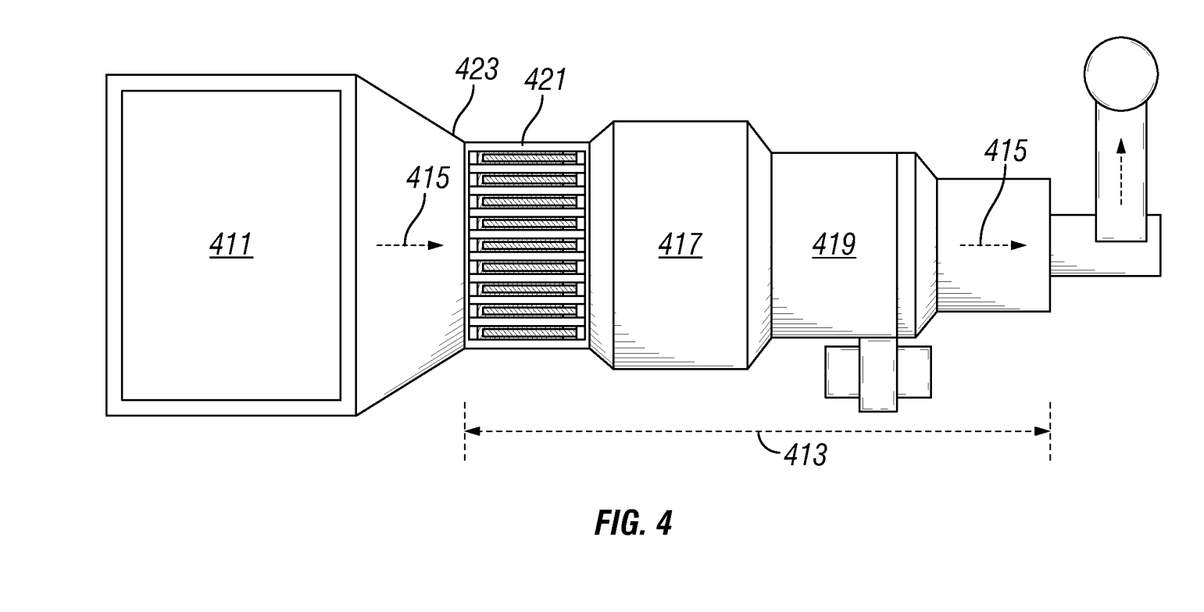
FIG. 4 is a schematic diagram of a steam reformer showing an alternative location for the membrane steam reformer unit.

FIG. 4 shows an alternative location of the membrane steam reformer unit. FIG. 4 shows the steam reformer furnace 411, convection zone 413, and flue gas direction 415. Additionally, process steam unit 417 and feed air pre-heater 419 are located in the convection zone 413. Downstream of the steam reformer furnace 411 and prior to membrane reformer 421 is flue gas manifold 423. Flue gas manifold 423 is a large converging section where the steam reformer furnace 411 transitions to convection zone 413.

Figure 5A:
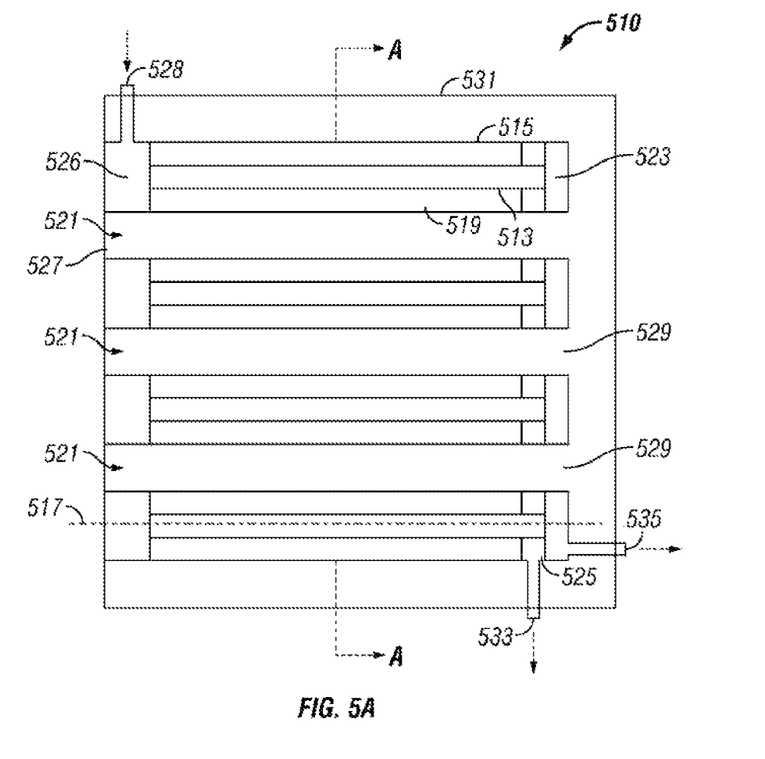
FIG. 5A is a schematic diagram showing the orientation of the membrane tubes of the membrane steam reformer unit.

Additionally, the membrane reformer is preferably arranged with the flue gas directed in a path parallel to or co-axial with the longitudinal axis of the membrane reformer tube. FIG. 5A shows a membrane reformer unit 510 with membrane reformer tubes comprising membrane tubes 513 and reaction tubes 515. The reaction tubes 515 and the membrane tubes have a longitudinal axis 517. It is preferable that flue gas 521 is directed across the reformer tubes in a direction parallel to the longitudinal axis of the reformer tubes. This orientation is preferable and will produces lower pressure drops and thus lower energy consumption. Alternatively, an orthogonal orientation (flue gas flow is orthogonal to the longitudinal axis of the reformer tubes) or other orientation could be employed. However, these orientations are not preferred because they will result in higher flue gas pressure drops across the membrane steam reformer unit and thus higher energy costs.

The reaction tube 515 of FIG. 5A surrounds the membrane tube 513, forming an annulus or reaction zone 519. Reaction zone 519 is packed with a catalyst, typically a nickel based catalyst, that converts the hydrocarbon and H$_2$O mixture to a CO$_2$ rich stream and H$_2$ as described in reaction (R3) above. The reformer tubes can be connected together to form a tube bundle. The reaction tubes 515 have a reaction tube feed header 526 that is connected to reaction tube feed conduit 528. The reaction tube feed conduit 528 directs hydrocarbon and H$_2$O to the reaction tube feed header 526 and the reaction zone 519 of the membrane reformer tubes. The reaction tubes also have a CO$_2$ extraction conduit 533 that is connected to reaction tube extraction header 525. The reaction tube extraction header 525 collects CO$_2$ rich gas from the reaction zone 519 and directs the CO$_2$ rich gas to CO$_2$ extraction conduit 533. The membrane tubes 513 also have a membrane tube header 523 that is connected to H$_2$ extraction conduit 535. H$_2$ extraction conduit 535 directs the H$_2$ product to storage or other unit operations.

Figure 5B:
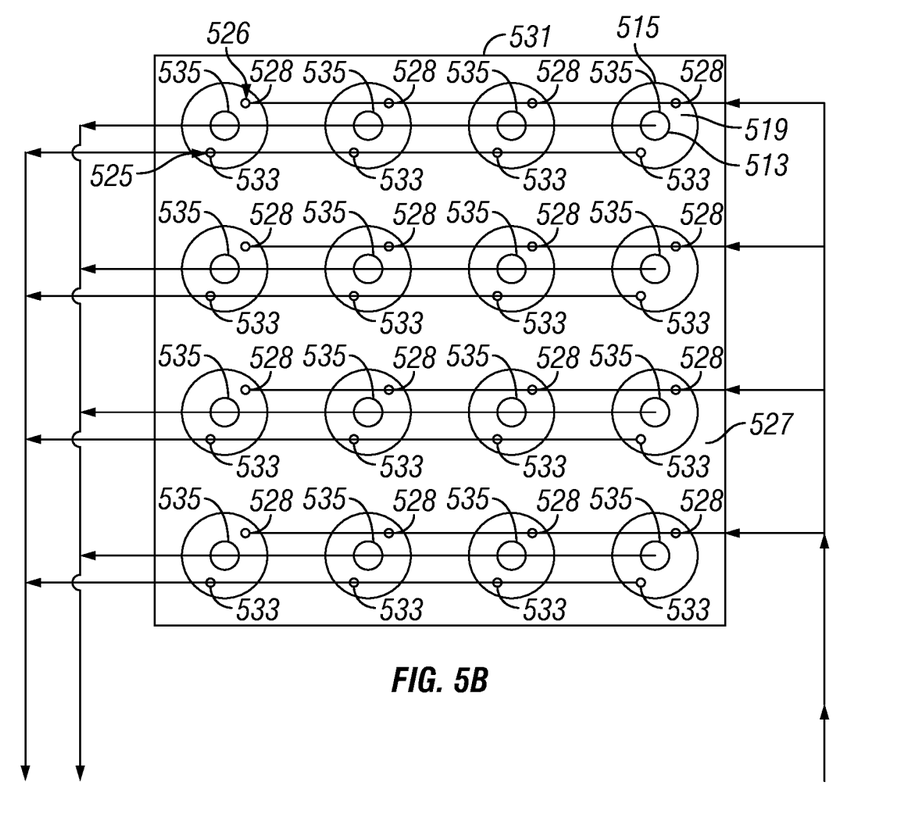
FIG. 5B is a schematic diagram showing cross-section A-A of the FIG. 5A.

FIG. 5B shows cross-section A-A of FIG. 5A and depicts one orientation of the reformer tubes of the membrane reformer unit. FIG. 5B shows reactor tube 515 surrounding membrane tube 513, which forms annulus or reaction zone 519. FIG. 5B also shows the connections between the membrane tube header 523 and H$_2$ extraction conduit 535, the reaction tube feed header 526 and reaction tube feed conduit 528, and the reaction tube extraction header 525 and the CO$_2$ extraction conduit 533. The tubes in FIG. 5B are arranged in a rectangular pattern; however, other patterns can be employed depending on the specific application conditions and geometry of the convection section of the heater the membrane reactor is inserted.

Figure 6A:
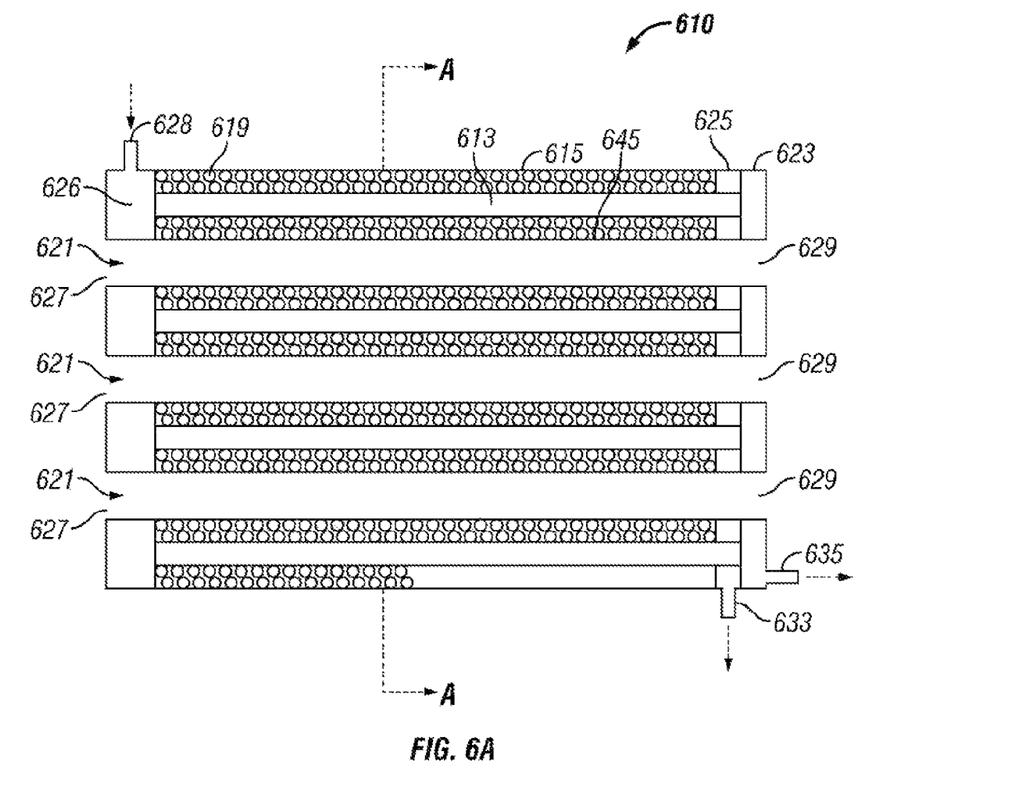
FIG. 6A is a schematic diagram showing an alternative orientation of the membrane tubes of the membrane steam reformer unit.

FIG. 6A shows another alternative configuration. FIG. 6A shows a membrane reformer unit 610 with a membrane reformer tube comprising a reaction tube 615, membrane tubes 613 and flue gas tubes 645. Flue gas 621 enters the flue gas tubes 645 through flue gas inlet 627 to provide heat to the catalyst 619 in the reaction zone. The membrane tubes 613 and flue gas tubes 645 are spaced throughout the reaction tube. Catalyst 619 is then packed around the membrane tubes 613 and the flue gas tubes 645. Feed inlet conduit 628 is connected to feed inlet header 626 that directs the hydrocarbon and $H_2O$ mixture to the reaction zone. $CO_2$ extraction conduit 633 is connected to $CO_2$ extraction header 625 which collects the $CO_2$ rich gas from the reaction zone. The $H_2$ outlet conduit 635 is connected to $H_2$ outlet header 623 which collection the $H_2$ rich gas from the process.

Figure 6B:
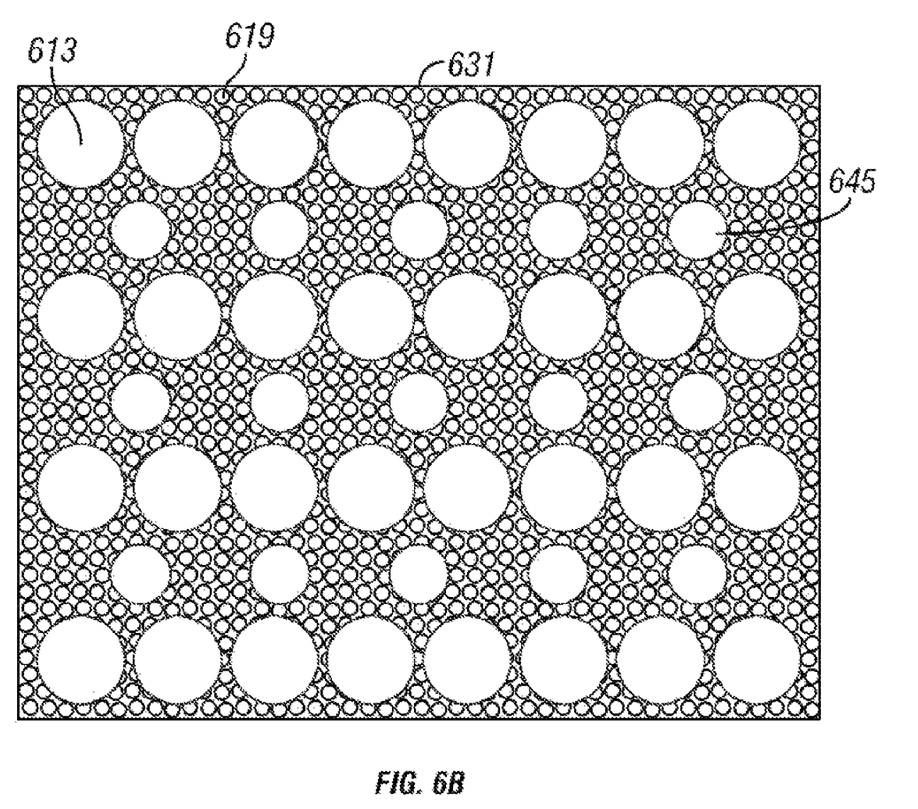
FIG. 6B is a schematic diagram showing cross-section A-A of FIG. 6A.

FIG. 6B shows cross-section A-A of FIG. 6A. FIG. 6B shows the orientation of the flue gas tubes 645 and the membrane tubes 613. Packed around the membrane tubes 613 and the flue gas tubes 645 is catalyst 619.

Figure 7:
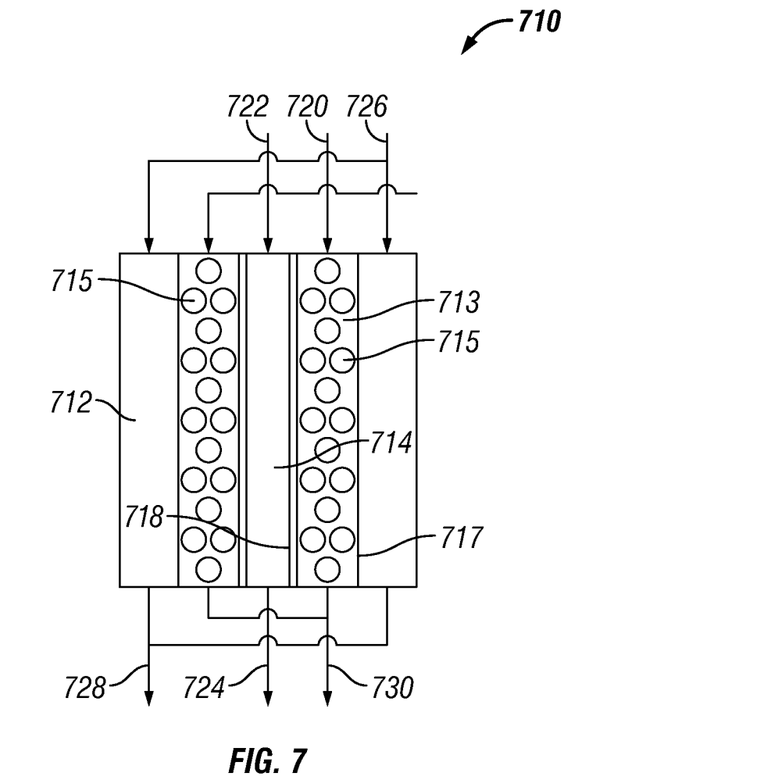
FIG. 7 is a schematic diagram showing the membrane steam reforming unit with reaction tube and membrane tube.

FIG. 7 shows a schematic diagram of the membrane steam reforming unit with heater section, catalyst section, and permeate section. Unit 710 consists of three concentric sections. The outer concentric section 712 is the heater section, while the inner concentric section 714 is the permeate section which is formed by membrane tube 718. The annulus in between the heater section and permeate section is the catalyst section 713 and is formed by reaction tube 717 which surrounds membrane tube 718. Reforming catalyst 715 is loaded into the catalyst section 713 wherein the combination reaction (R3) described above takes place. (The catalyst section may also variously referred to as the annulus section, the reaction section or reaction zone). The membrane 719 is represented as being on the inside of membrane tube 718 within the permeate section 714 in FIG. 7. The heater section 712 allows for flow of the flue gas the region surrounding the reaction section. While FIG. 7 shows the heater section, catalyst section, and permeate section placed in order from outside in, the location of the membrane and heater section can be reversed to achieve higher membrane area. A similar membrane reformer unit utilizing a flameless distributed combustion heater is disclosed U.S. Pat. No. 6,821,501, which is incorporated by reference herein in its entirety.

While the proceeding describes the membrane tube and reactor tube as generally having a circular cross-section, it should be understood that membrane tube and reactor tube should not be considered to be limited to a tube with a circular cross-section. Other cross-sections including, but not limited to oval, square, rectangular, octagonal are also considered to be included.

The feed gas stream containing a mixture of vaporizable hydrocarbon (e.g. naphtha, methane or methanol) and $H_2O$ with a preferred minimum overall 0:C ratio of 2:1 enters catalyst section 713 at 720. If used, sweep gas for promoting the diffusion of hydrogen through the membrane enters the top of the permeate section 714 at 722. Alternatively, sweep gas can be introduced into the permeate section by means of a stinger pipe fitted to bottom of the permeate section. In the case of this alternative, hydrogen in sweep gas would exit the permeate zone at the bottom of the permeate section at 724. Optionally, the stinger pipe to introduce the sweep gas may be connected at the top of the permeate section in which case the hydrogen and sweep gas would exit at the top of this section. Hot flue gas enters the heater section at 726. Hydrogen (pure or in sweep gas) exits at 724. Flue gas from the heater section exits at 728. Unreacted products and by-products (e.g., $CO_2$, $H_2O$, $H_2$, $CH_4$, and CO) exit catalyst section 713 at 730. It is also possible to remove the produced hydrogen using a vacuum instead of a sweep gas.

The sweep gas can also be used to control the temperature of the membrane tube. High temperatures can damage the membrane tube. The membrane coating of the membrane tube is temperature sensitive. Thus, the membrane tube must be maintained below a temperature dependent on the specific membrane material use. In the membrane reactor, there are temperature gradients setup with the hottest temperature being the wall of the reaction tube 717 and the coolest temperature being the wall of the membrane tube 714. By passing a sweep gas, such as steam, through the membrane tube 714, the temperature of the membrane tube wall can be controlled to maintain the temperature of the membrane tube wall below a critical temperature. For example, the temperature of the steam passing through the membrane tube could be varied to control the membrane tube wall temperature. Alternatively, the volume of the sweep gas could be varied to maintain the temperature of the membrane tube wall at temperature necessary to prevent damage to the membrane tube.

The reaction zone of a membrane steam reforming unit of the present invention operates at a lower temperature than used in commercial steam methane reformers. A suitable temperature is less than about 700° C., for example in the range of from about 300° C. to about 650° C. In some cases lower temperatures, e.g., as low as about 200° C. can be used up to about 600° C. A preferred range is from about 400° C. to about 550° C., more preferably from about 400° C. to about 500° C. Suitable pressure is in the range of from about 1 to about 200 bar, preferably from about 10 to about 50 bar. This low temperature achieves high selectivity to $CO_2$ and negligible selectivity to CO.

Any vaporizable (or optionally oxygenated) hydrocarbon can be used in the present process or apparatus, including, but not limited to, methane, methanol, ethane, ethanol, propane, butane, light hydrocarbons having preferably 1-4 carbon atoms in each molecule, and light petroleum fractions like naphtha at boiling point range of 120° F.-400° F., which is a typical feed for commercial steam reformers. Petroleum fractions heavier than naphtha can also be employed like diesel or kerosene or jet fuel at boiling point range of 350° F.-500° F., or gas oil at boiling point range of 450° F.-800° F. Hydrogen, carbon monoxide and mixtures thereof, e.g., syngas, can also be used in the process and apparatus of the present invention, and are included in the definition of "vaporizable hydrocarbon." Methane was used in the examples to demonstrate the process; such examples should be understood to be non-limiting.

Another advantage with the integration of membrane steam reformer unit with conventional steam reforming, is that one can employ lower steam to carbon ratios (S:C ratios) without incurring coking problems. With conventional steam methane reformers the typical minimum S:C ratio which can be used is about 3:1 before incurring moderate to severe coking problems. With membrane steam reformer units, it is possible to use S:C ratios as low as 2.8, down to 2.6, without coking problems, with the minimum S:C ratio being about 2:1. This results in lower energy costs if methane is used as the feed in the present invention, since lower steam to methane ratios can be used thus requiring less energy to vaporize water. Because of the ability to operate at lower S:C ratios, it is also possible to use heavier, less expensive feeds in membrane steam reformer unit than in steam reformer reactor.

The reactor annulus is packed with steam reforming catalyst and equipped with a perm-selective (i.e., hydrogen-selective) membrane that separates hydrogen from the remaining gases as they pass through the catalyst bed. The steam reforming catalyst can be any known in the art. Typically steam reforming catalysts which can be used include, but are not limited to, Group VIII transition metals, particularly nickel. It is often desirable to support the reforming catalysts on a refractory substrate (or support). The support is preferably an inert compound. Suitable compounds contain elements of Group III and IV of the Periodic Table, such as, for example the oxides or carbides of Al, Si, Ti, Mg, Ce and Zr. The preferred support composition for the reforming catalyst is alumina.

As the hydrogen is formed in the catalyst bed, it is transported out through the hydrogen-permeable separation membrane filter. This is advantageous because essentially pure hydrogen can be separated from any poisons that may also be present, including CO and $H_2S$, and from other fuel diluents. The poisons do not pass through the separation membrane, which is fabricated from one of a variety of hydrogen-permeable and hydrogen selective materials including ceramics, carbon, and metals.

Membranes suitable for use in the membrane steam reformer unit include various metals and metal alloys on a porous ceramic or porous metallic supports. The porous ceramic or porous metallic support protects the membrane surface from contaminants and, in the former choice, from temperature excursions. The preferred membrane support is porous stainless steel. Alternatively, the Pd layer can be deposited on the outside of the porous ceramic or metallic support, in contact with the catalyst section. The inertness, range of porosity available, and the fact that, to some extent, alumina can function as an insulator, also make it a good choice for the support. Additional advantages include the fact the alumina can function to filter off material that might deposit on the membrane and foul it. The use of alumina also makes it possible to control the distance of the membrane from the catalyst section, and, therefore, control the temperature drop across the operating membrane at a given temperature and maximum effectiveness, and lessens the likelihood of overheating. It is also possible to use the ceramic support as an insulating layer to keep the membrane at the design temperature. The temperature of the sweep gas may also be controlled to adjust the membrane temperature. The membrane permeate side can provide extra heat transfer area, with superheated steam used as sweep gas and also as a heat transfer fluid for heating and temperature control. Also, a combustion catalyst with some oxygen injection via a perforated tube can oxidize some of the produced hydrogen to supply the enthalpy to drive the steam reforming reaction. The presence of Pd or Pd-alloy in the vicinity of the air and hydrogen mixture makes this reaction occur at lower temperature than the autoignition temperature of hydrogen and air (which is 571° C.). This results in a heat source that does not exceed the maximum operating temperature of the preferred Pd membrane, which is around 550° C. This internal heating concept is based on flameless distributed combustion concepts, and is an example of inverse combustion, and may be used with or without catalyst surrounding the perforated tube that supplies the oxygen. Optionally, a suitable methanation catalyst may be placed in the permeate compartment as an extra safeguard to CO penetration through the hydrogen membrane if small pinholes develop. This catalyst could convert CO to methane and keep the CO level in the hydrogen stream always in the parts per million range. Typically, the CO level in the hydrogen stream exiting the membrane steam reforming reactor of the present invention will be less than about 10 ppm, e.g., less than 5 ppm, 2 ppm, 1 ppm or 0.1 ppm.

Preferred materials for fabricating said membrane include mainly, but not exclusively, metals of Group VIII, including, but not limited to Pd, Pt, Ni, Ag, Ta, V, Y, Nb, Ce, In, Ho, La, Au, Ru etc. particularly in the form of alloys. Pd and Pd alloys are preferred. The membrane used to demonstrate the present invention was a very thin film of a palladium alloy having a high surface area. Membranes of this type can be prepared using the methods disclosed in U.S. Pat. Nos. 6,152,987 and 7,175,694, which are incorporated by reference herein in their entirety. Platinum or a platinum alloy would also be suitable.

As mentioned, with respect to FIG. 6, the membrane is pictured on the inside of the smaller (i.e., the inner) concentric section, which reduces the surface area to a minimum. In order to obtain greater flux the membrane could be placed on the outside of the larger section of the reactor. Changes in geometry of the membrane permit a number of options depending on requirements as will be apparent to those skilled in the art. For example, one option is to place the membrane on the outside of the reactor wall to achieve higher surface area. If the membrane was placed on the outside tube of the 14 cm diameter as opposed to the inside of the tube, the surface area value can be increased by a factor of 2. Also, it is possible to use more tubes of smaller diameter to achieve a higher surface to volume ratio A jagged cross-section of the membrane tube (with a star shape for instance) could increase the surface area. Finally, the space velocity of the gas may be reduced by a factor of 2-3 or 2200-3300 $h^{-1}$ to allow more time for the hydrogen to diffuse through the membrane.

EXEMPLIFICATION

The following example will serve to illustrate the invention disclosed herein. The examples are intended only as means of illustration and should not be construed as limiting the scope of the invention in any way. Those skilled in the art will recognize many variations that may be made without departing from the spirit of the disclosed invention.

Typical steam methane reformer furnaces operating at 100 MMSCF/D $H_2$ produce 118 MMBTU/Hr of waste heat. Typically, this waste heat is recovered to produce 91,000 Lbs/Hr of export steam (700° F., 650 psig). If a portion of the waste heat is used to produce hydrogen using a membrane steam reformer unit, additional hydrogen can be produced from the same steam methane reformer furnace. Based on commercial membrane steam reformer units producing 8.3 MMSCF/D $H_2$, approximately 2.33 MMBTU is necessary to produce one MMSCF of hydrogen. Using approximately one-half of the waste heat would result in an additional 20 MMSCF/D of $H_2$ production. This is approximately a twenty-five percent increase in production ("debottelnecking") of a typical 100 MMSCF/D $H_2$ plant.

| | SMR H2 Capacity (mm scfd) | Membrane Reformer Cap. (mmscfd) | SMR Heat Duty (MM Btu/hr) | SMR NG Feed (MSCFH) | Export Steam 650 psig. 700° F. (Mlbs/hr) | Membrane Reformer (MSCFH) | Export Steam Heat Value (MM Btu/hr) | Gross Efficiency w/Exp. Steam (Btu/scf) | Net Efficiency w/o Exp. Steam (Btu/scf) | Total H2 Capacity (mm scf) |
|---|---|---|---|---|---|---|---|---|---|---|
| Traditional SMR Plant | 100 | 0 | 591 | 1000 | 0 | 91 | 118 | 410 | 381 | 100 |
| SMR with Membrane Reformer | 100 | 20 | 591 | 1000 | 273 | 0 | 0 | 372 | 372 | 120 |

| | Total H2 Capacity (mm scf) | Membrane Reformer Cap. (mmscfd) | SMR Heat Duty (MM Btu/hr) | SMR NG Feed (MSCFH) | Membrane Reformer Feed (MSCFH) | CO2 Generation Feed + Fuel (scf CO2/scf H2) | CO2 Captured Feed + Fuel (scf CO2/scf H2) |
|---|---|---|---|---|---|---|---|
| Traditional SMR Plant | 100 | 0 | 591 | 1000 | 0 | 381 | 0 |
| SMR with Membrane Reformer | 100 | 20 | 591 | 1000 | 273 | 372 | 0.09 |

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

That which is claimed is:

1. A process system, comprising:
    a steam reformer furnace, having a reformer reactor located within a radiant section of said furnace and a convection section located downstream from said radiant section and connected by a furnace conduit,
        wherein provided within said radiant section is fuel combustion means for combustion a fuel source to release radiant energy to drive a reforming reaction within said reformer reactor and for yielding hot flue gases produced during combustion of a fuel source by said fuel combustion means, and
        wherein said furnace conduit provides means for transporting said flue gases to said convection section;
    a membrane reformer unit in addition to said reformer reactor located within said radiant section;
        wherein said membrane reformer unit is positioned within said convection section of said steam reformer furnace, so that said flue gases transported from said radiant section contact said membrane reformer unit in said convection section to transfer convective heat to said membrane reformer unit;
        wherein said membrane reformer unit comprises a plurality of membrane reformer tubes each comprising a membrane tube and a reaction tube and connected together to form a tube bundle;
        wherein said membrane tube having a membrane tube length and a membrane tube wall that defines a product extraction zone;
        wherein said membrane tube includes a distal end and a product outlet end operatively connected to a membrane tube header providing for discharging a product comprising hydrogen;
        wherein said reaction tube having a reaction tube length and that is positioned external to and surrounding said membrane tube so as to define a reaction zone along said membrane tube length; and
        wherein said reaction tube has a reaction tube inlet operatively connected to a reaction tube feed header providing for receiving a reactant feed comprising a mixture of hydrocarbons and steam into said reaction zone, and a reaction zone outlet operatively connected to a reaction tube extraction header providing for discharging a reaction product comprising carbon dioxide from said reaction zone.

2. The process system of claim 1, wherein said reaction zone is packed with a reaction catalyst.

3. The process system of claim 2 wherein said membrane tube wall comprises a porous metal substrate and a hydrogen-selective membrane, wherein the hydrogen-selective membrane overlies said porous metal substrate.

4. The process system of claim 3 wherein said hydrogen-selective membrane includes palladium or any alloy thereof.

5. The process system of claim 2 wherein said reaction catalyst is any reforming catalyst, supported or unsupported.

6. The process system of claim 2 wherein a longitudinal axis of said membrane reformer tubes of said membrane reformer unit is parallel to the direction of flow of the flue gases through said convection section of said steam reformer furnace.

7. The process system of claim 2 wherein a longitudinal axis of said membrane reformer tubes of said membrane reformer unit is orthogonal to the direction of flow of the flue gases through said convection section of said steam reformer furnace.

* * * * *